(12) United States Patent
Izydorek

(10) Patent No.: US 9,016,750 B2
(45) Date of Patent: Apr. 28, 2015

(54) VEHICULAR STORAGE SYSTEM

(75) Inventor: Jake Izydorek, Burlington, WI (US)

(73) Assignee: Cap-Pack Truck Products LLC, East Troy, WI (US)

( * ) Notice: Subject to any disclaimer, the term of this patent is extended or adjusted under 35 U.S.C. 154(b) by 0 days.

(21) Appl. No.: 13/215,278

(22) Filed: Aug. 23, 2011

(65) Prior Publication Data

US 2012/0080901 A1      Apr. 5, 2012

Related U.S. Application Data

(60) Provisional application No. 61/388,912, filed on Oct. 1, 2010.

(51) Int. Cl.
*B60R 9/042* (2006.01)
*B60R 9/045* (2006.01)
*B60R 9/055* (2006.01)

(52) U.S. Cl.
CPC ............... *B60R 9/042* (2013.01); *B60R 9/045* (2013.01); *B60R 9/055* (2013.01)

(58) Field of Classification Search
CPC ........................................................ B60R 9/042
USPC ............ 224/402, 403, 404; 296/26.08, 26.09, 296/26.1, 37.6, 37.7, 37.8, 24.44, 100.03
See application file for complete search history.

(56) References Cited

U.S. PATENT DOCUMENTS

| | | | |
|---|---|---|---|
| 3,471,045 A * | 10/1969 | Panciocco | 414/522 |
| 3,476,433 A * | 11/1969 | Windham, Jr. | 296/24.44 |
| 4,159,844 A | 7/1979 | Weiner | |
| 4,283,083 A * | 8/1981 | Johnson | 296/37.1 |
| 4,573,731 A * | 3/1986 | Knaack et al. | 296/37.6 |
| 4,681,360 A * | 7/1987 | Peters et al. | 296/37.6 |
| 4,776,629 A * | 10/1988 | Cross | 296/100.03 |
| 4,900,217 A * | 2/1990 | Nelson | 414/537 |
| 4,915,437 A * | 4/1990 | Cherry | 296/37.6 |
| 5,127,697 A * | 7/1992 | St. Marie | 296/26.09 |
| 5,172,952 A * | 12/1992 | Lasnetski | 296/37.8 |
| 5,207,470 A * | 5/1993 | Rafi-Zadeh | 296/37.7 |
| 5,454,684 A * | 10/1995 | Berens | 414/522 |
| 5,476,301 A * | 12/1995 | Berkich | 296/3 |
| 5,597,103 A * | 1/1997 | Nichols | 224/324 |

(Continued)

FOREIGN PATENT DOCUMENTS

JP            2007331693 A      12/2007

OTHER PUBLICATIONS

International Search Report for PCT/US2011/054122 Dated Apr. 13, 2012.

*Primary Examiner* — Glenn Dayoan
*Assistant Examiner* — Paul Chenevert
(74) *Attorney, Agent, or Firm* — Boyle Fredrickson, S.C.

(57) ABSTRACT

A vehicular storage system includes a frame coupled to an interior of a rear of a vehicle and a drawer, which is movably coupled to the frame. The drawer of the system is movable between a stowed position in which most or at least a substantial portion of the drawer is within the rear of the vehicle and a deployed position in which a substantial portion of the drawer is positioned rearward of the vehicle in a manner that makes the contents of the drawer accessible to a user outside of the vehicle. The drawer includes drop rails on opposing sides engageable with a pair of corresponding stationary frame rollers so that the drawer is movable along a path defined by the drop rails relative to the frame rollers of the frame.

5 Claims, 8 Drawing Sheets

(56) References Cited

U.S. PATENT DOCUMENTS

| | | | |
|---|---|---|---|
| 5,829,813 A * | 11/1998 | LaValle | 296/37.6 |
| 5,893,598 A * | 4/1999 | Silkowski et al. | 296/37.6 |
| 5,927,782 A * | 7/1999 | Olms | 296/3 |
| 5,988,722 A * | 11/1999 | Parri | 296/26.09 |
| 6,015,177 A * | 1/2000 | Tijerina | 296/37.6 |
| 6,033,002 A * | 3/2000 | Clare et al. | 296/3 |
| 6,077,024 A * | 6/2000 | Trueblood | 414/462 |
| 6,328,364 B1 | 12/2001 | Darbishire | |
| 6,328,366 B1 * | 12/2001 | Foster et al. | 296/37.6 |
| 6,331,026 B1 * | 12/2001 | Adsit et al. | 296/37.7 |
| 6,332,638 B1 * | 12/2001 | Menna | 296/20 |
| 6,347,731 B1 * | 2/2002 | Burger | 224/405 |
| 6,390,525 B2 * | 5/2002 | Carpenter et al. | 296/26.09 |
| 6,572,168 B1 * | 6/2003 | Radstake | 312/247 |
| 6,637,793 B2 | 10/2003 | Krause | |
| 6,641,201 B1 * | 11/2003 | Pietryga et al. | 296/100.1 |
| 6,811,068 B2 * | 11/2004 | Johnson | 224/404 |
| 6,820,915 B2 * | 11/2004 | Mack et al. | 296/100.08 |
| 6,832,798 B1 * | 12/2004 | Krause | 296/3 |
| 6,921,120 B1 * | 7/2005 | Ervin | 296/26.02 |
| 6,938,940 B1 * | 9/2005 | Lipke et al. | 296/37.7 |
| 7,111,884 B2 * | 9/2006 | Johnson | 296/26.1 |
| 7,121,602 B2 * | 10/2006 | Queveau et al. | 296/24.44 |
| 7,281,745 B1 * | 10/2007 | Meinke et al. | 296/26.1 |
| 7,914,064 B2 * | 3/2011 | Joab | 296/100.03 |
| 8,075,035 B1 * | 12/2011 | Sullivan | 296/24.4 |
| 8,162,367 B2 * | 4/2012 | Kuklok | 296/3 |
| 8,256,816 B2 * | 9/2012 | Fischer et al. | 296/24.44 |
| 8,256,817 B2 * | 9/2012 | Hobrecht et al. | 296/26.07 |
| 2001/0050299 A1 * | 12/2001 | Coleman et al. | 224/404 |
| 2002/0094261 A1 * | 7/2002 | Fischer et al. | 414/537 |
| 2003/0002969 A1 * | 1/2003 | Risser | 414/542 |
| 2004/0062629 A1 * | 4/2004 | Kelly | 414/462 |
| 2006/0125269 A1 | 6/2006 | Kunz | |
| 2010/0308615 A1 * | 12/2010 | Miles | 296/37.8 |

* cited by examiner

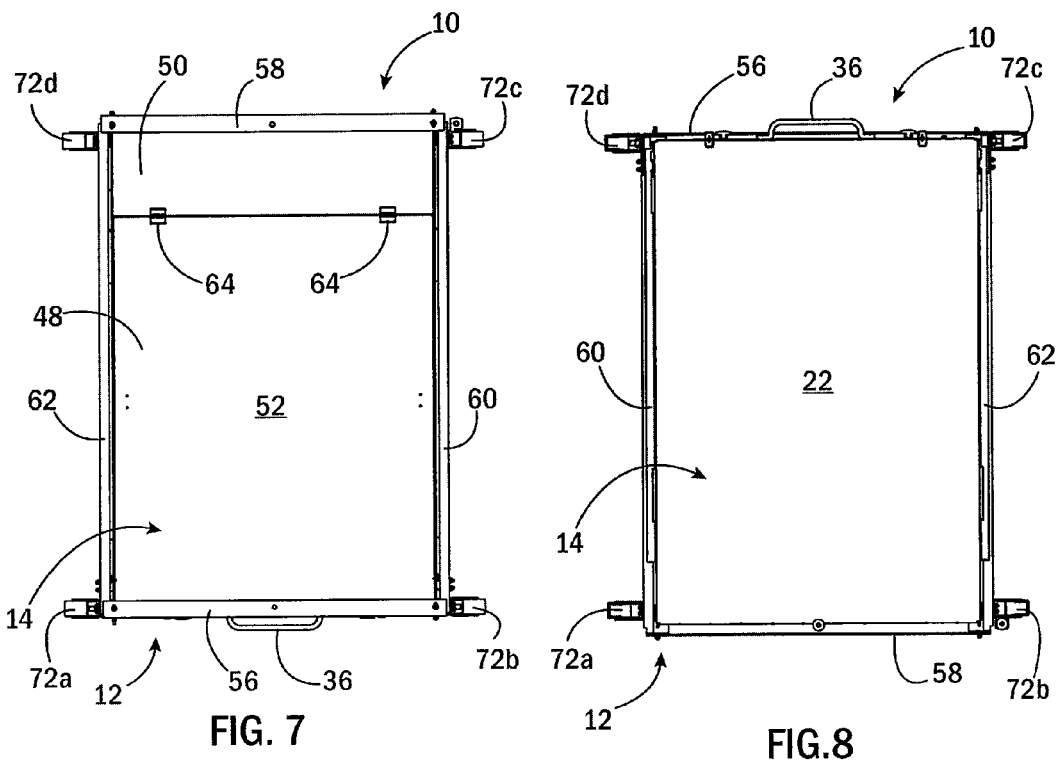
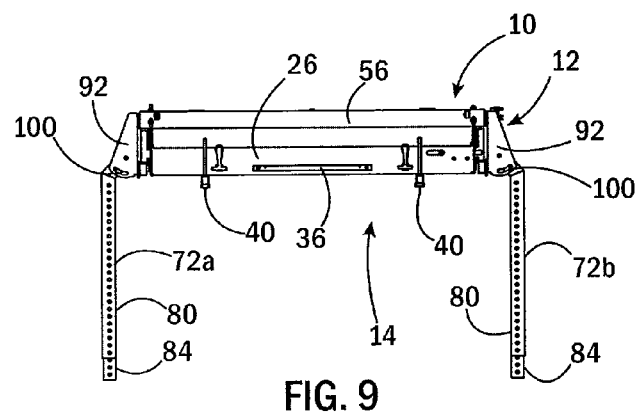

VEHICULAR STORAGE SYSTEM

CROSS-REFERENCE TO RELATED APPLICATIONS

The present application claims priority to U.S. Provisional Patent Application Ser. No. 61/388,912 filed on Oct. 1, 2010 and entitled Vehicular Storage System.

BACKGROUND OF THE INVENTION

1. Field of the Invention

The invention generally relates to vehicular storage systems. More particularly, the invention relates to a vehicular storage system movably mounted within the rear of a vehicle for selective extension of at least a portion of the vehicular storage system from a rear of the vehicle such that the contents of the vehicular storage system may be accessed.

2. Discussion of the Related Art

Vehicular storage systems and systems are generally well known in the art. In particular, it has been known to provide vehicular storage systems in the rear storage compartments of vehicles such as pickup trucks, vans and the like. Typically, these rear vehicular storage systems include racks or similar structures that are elevated above the bed of the vehicle such that additional cargo may be stored above the bed of the vehicle. However, most vehicles have a roof or other ceiling structure that limits the amount of clearance for accommodating storage racks. For instance, pickup trucks often have cap located above the bed of the truck. Further, known racks are generally visible to passersby such that it is inadvisable for persons utilizing such racks to use them to store valuable equipment such as tools, hunting equipment, electronics, or other valuables that may entice ne'er-do-wells to enter the vehicle by force to remove the items. Further, racks of this kind typically obstruct a driver's view through their rearview mirror or through the back window of the vehicle. Articles stored on these racks are also typically difficult to access from the rear of the vehicle.

One alternative to these known rack systems has been to provide a rack, otherwise known as a drawer or a pan, that mounts over the bed of the vehicle beneath the cap or ceiling thereof. In this manner, the bed of the vehicle remains open for additional space while the cap or ceiling area defining an upper area of the rear of the vehicle may be more effectively used for storing items. Further, such racks are less conspicuous to passersby such that a person may more safely store their valuables in these racks without fear of having them stolen.

However, these alternative designs suffer from a number of disadvantages. In particular, these known designs are quite complex and require a great deal of infrastructure to mount and secure to the interior of the vehicle's storage area. In addition, these known designs include a number of moving parts that are prone to failure, thereby reducing the reliability of the assemblies. Further, these known racks are typically quite difficult to access, particularly from outside of the vehicle. Specifically, a person must enter the rear of the vehicle in order to access the contents of the rack, even once the rack is lowered from a stowed position to a deployed position. Further, these known designs require that the user must enter the vehicle simply to move the rack from its stowed to its deployed position.

The need therefore exists to provide a vehicular storage system that does not suffer from the foregoing disadvantages. In particular, it is desired to provide a vehicular storage system that is simple in construction. Further, it is desired to provide a vehicular storage system that may accessed from outside of the vehicle.

SUMMARY OF THE INVENTION

In accordance with a first aspect of the invention, at least one of the above-identified needs is met by providing a vehicular storage system configured for selective movement between a stowed position in the upper area of a rear of a vehicle and a deployed position at least partially outside the rear of the vehicle such that the contents of the vehicular storage system may be accessed. In a preferred embodiment, the vehicular storage system includes a frame securely mounted within the vehicle and configured to support a drawer. The drawer is movably mounted on the frame for selective movement between the stowed position and the deployed position. The frame may include a pair of stationary frame rollers, one on either side of the frame. The drawer may include a corresponding pair of drop rails configured to engage the frame rollers for movement with respect to the frame. The drop rails are configured such that, when the drawer is in its deployed position, the drawer is positioned with its rear end facing generally downwardly while the remainder of the drawer extends upwardly therefrom. In this manner, the contents of the drawer are easily accessible from outside of the rear end of the vehicle.

The frame may include a pair of frame rails on either side of the frame for engaging with a corresponding pair of drawer rollers. The frame rails and the drawer rollers may be configured to secure the drawer to the frame such that the drawer is incapable of being removed therefrom. A stop may be provided in the frame rails for preventing the drawer from becoming disengaged with the frame.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 7 is a top plan view of the vehicular storage system of FIG. 1, with the vehicular storage system in the stowed position;

FIG. 8 is a bottom plan view of the vehicular storage system of FIG. 1, with the vehicular storage system in the stowed position;

FIG. 9 is a front elevation view of the vehicular storage system of FIG. 1, with the vehicular storage system in the stowed position;

DETAILED DESCRIPTION OF THE PREFERRED EMBODIMENTS

A vehicular storage system constructed in accordance with a preferred embodiment of the invention is described below in connection with a standard, exemplary vehicle. It should be understood that the illustrated system and others constructed in accordance with the invention could be used with other such vehicles including, but not limited to delivery vans and similar such vehicles for which rear storage is desirable.

Figure 1:
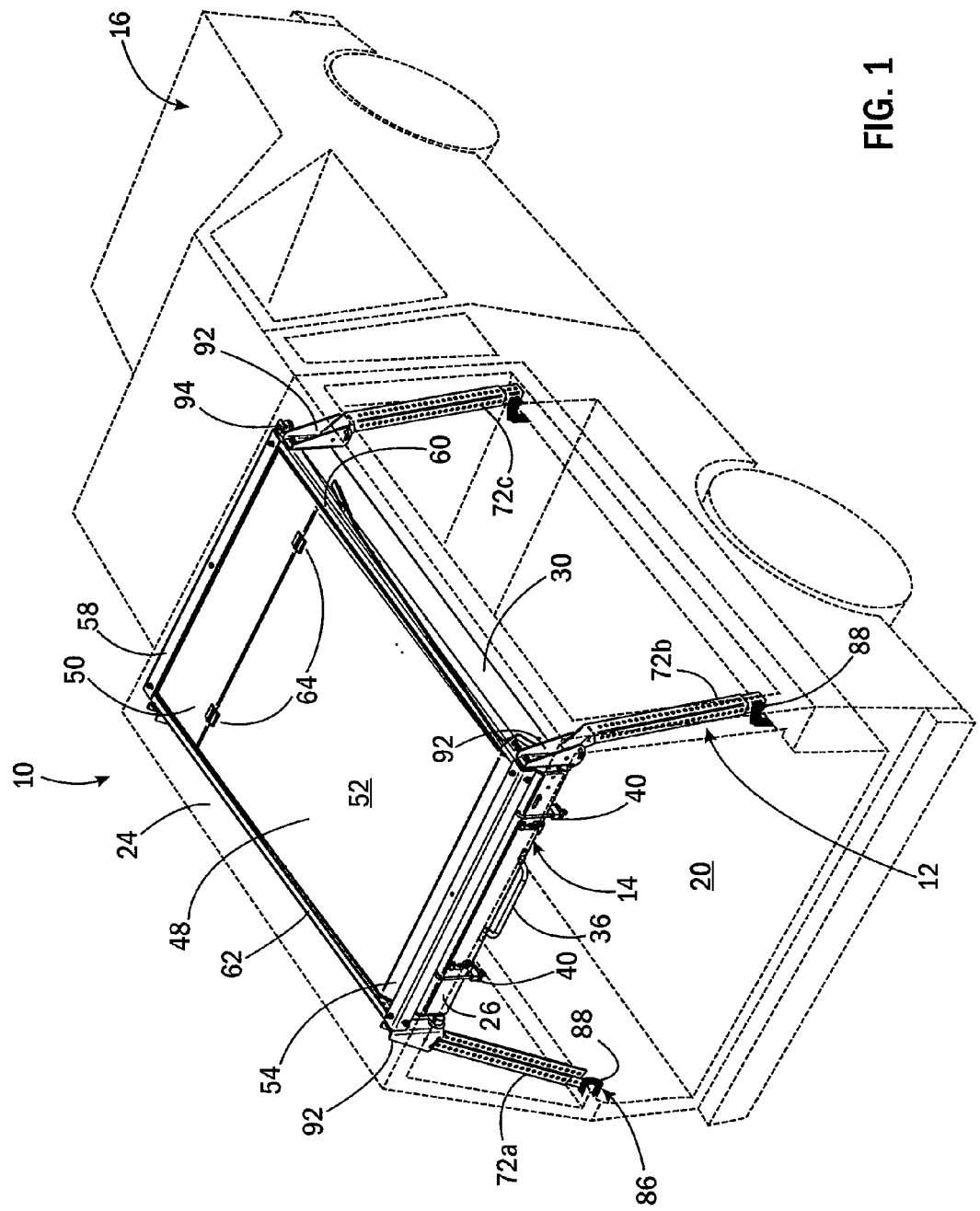
FIG. 1 is an isometric view of a vehicle shown in phantom with a vehicular storage system of the present invention mounted within a rear of the vehicle and showing a drawer of the storage system in a stowed position.
Figure 2:
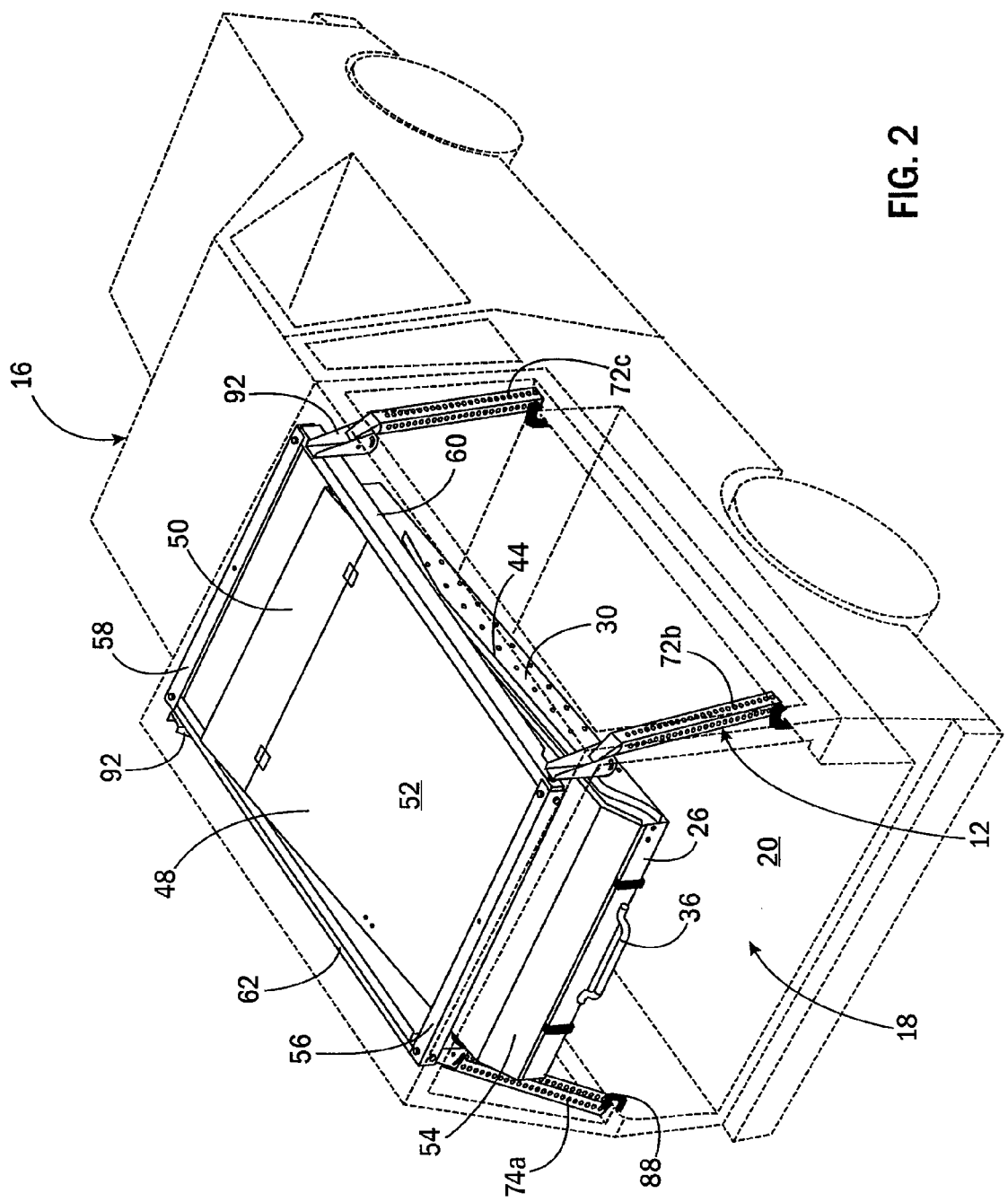
FIG. 2 is an isometric view similar to that of FIG. 1, in which the vehicular storage system is shown in an intermediate position in which a the drawer is positioned rearwardly of its fully-stowed position.
Figure 3:
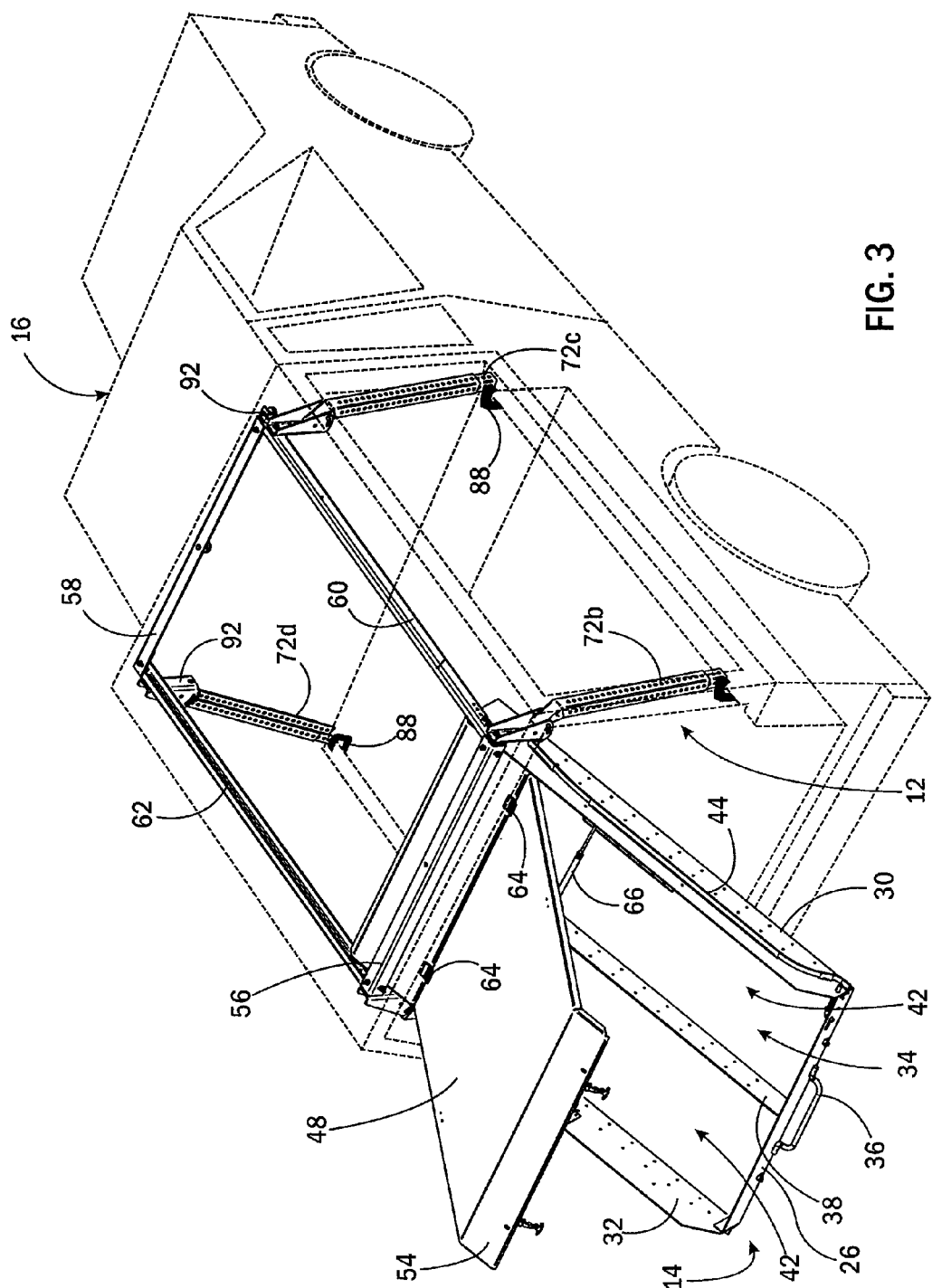
FIG. 3 is an isometric view similar to that of FIG. 1, in which the vehicular storage system is shown in a deployed position in which a substantial portion of the drawer is positioned rearward of the rear of the vehicle.

Referring initially to FIGS. 1-3, a vehicular storage system 10 according to the invention includes a frame 12 mounted to the interior 18 of a rear of vehicle 16 and a pan, storage compartment or drawer 14, which is movably secured to the frame 12. Vehicle 16 may be a pickup truck having a bed or floor 20, either with or without a cap or ceiling structure 24, or any other similar such vehicle such as a van or the like. In the case of the vehicle 16 employing a cap 24 such as in a pickup truck, a number of clamping arrangements 86 may be utilized in securing the cap 24 to the bed 20 as is generally understood. The clamping arrangement may be utilized along with the system 10 of the present invention as will be discussed in further detail herein. The storage system 10 is configured to be mounted and stored within the rear of the vehicle 16 in the area defined by the bed 20 and the cap 24 such that the storage system 10 occupies a minimum amount of space beyond that occupied by the drawer 14 to thereby permit the remainder of the rear of the vehicle 16 to be used for storing additional items. In addition, the storage system 10 of the invention is configured to be stowed in an inconspicuous manner so that the user of the storage system 10 may securely store valuables within the drawer 14 without fear of having the valuable stolen or otherwise tampered with.

The drawer 14 is movably mounted between the frame 12 so that it may be selectively moved with respect to the frame 12 (1) from a stowed position as shown in FIG. 1 in which the entirety of the drawer 14 resides within the interior 18 of the vehicle 16 and is situated substantially horizontally and (2) a deployed position as shown in FIG. 3 in which at least a portion of the drawer 14 is positioned rearward of the vehicle 16 and extends at an angle such that a rear end of the drawer 14 is substantially lower than a front end. The drawer 14 may additionally be situated in an intermediate position (see FIG. 2) in which the drawer is initially lowered from the stowed position or raised from the deployed position and in which the rear end of the drawer 14 extends downwardly relative to the front end and projects rearwardly from the rear of the vehicle 16 to a lesser degree than in the deployed position.

As will be discussed in further detail herein, the drawer 14 includes a pair of drop rails 44, 46 positioned along each of the respective side walls 30, 32, and the frame 12 includes a corresponding pair of frame rollers 106 configured to engage the respective pair of drop rails 44, 46. In this manner, the drawer 14 may be moved between the stowed and deployed positions along a path defined by the drop rails 44, 46 relative to the frame rollers 106. In an alternative construction (not shown), drop rails may be carried on the frame 12, and the drawer 14 may include a set of drawer rollers configured to enable movement of the drawer 14 relative to the frame 12.

Also as will be discussed in more detail below, the drawer 14 additionally includes a pair of drawer rollers 94 mounted on a forward end of the drawer 14 and configured to engage a corresponding pair of frame rails 78 disposed on the frame 12. The drawer rollers 94 and the frame rails 78 are provided to maintain the drawer 14 in engagement with the frame 12 and to additionally assist in the movement of the drawer 14 relative to the frame 12. Understandably, the drawer rollers 94 could be disposed on the frame 12 and the frame rails 78 could be coupled to the drawer in carrying out the present invention.

In the deployed position, the drawer 14 is positioned so that the contents of the drawer 14 may be selectively accessed by an operator of the storage system 10. When the drawer 14 is in the stowed position, the drawer 14 is oriented substantially parallel relative to the ground and when the drawer 14 is in the deployed position, the drawer 14 is oriented at an angle of between approximately 10-45 degrees relative to the ground. Vehicles have a large variety of tailgate or rear heights and configurations, and therefore it is understood that the drawer 14 may be adjusted to allow the drawer 14 to be moved to the deployed position without coming into contact with the tailgate regardless of the type of vehicle 16 in which it is installed. Therefore, it is understood that, while an angle of 10-45 degrees relative to the ground may suffice in accommodating most vehicles 16, it is to be understood that the system 10 of the present invention is in no way so limited, and other orientations are within the scope of the present invention. Further, when the drawer 14 is in its stowed position, it is preferably maintained at a height that does not obstruct the use of the rearview mirror to look through the rear window of the vehicle 16 without being obstructed by the system 10. Similarly, the driver can turn his or her head to look directly through the rear window without being obstructed by system 10. In this manner, the driver of vehicle 16 can safely operate vehicle 16 without having his or her view obstructed.

Referring now to FIGS. 4-9, a preferred but exemplary embodiment of the storage system 10 is illustrated wherein the drawer 14 includes a bottom wall or floor 22, a rear end wall 26, a front end wall 28 opposite the rear end wall 26, and a pair of opposing side walls 30, 32 that are connected to one another to define a cavity 34. The cavity 34 is configured to receive items to be stored such as, for example, clothing, equipment, sporting goods, ammunition, hunting supplies, electronics, and the like. As can be readily appreciated, the items to be stored in drawer 14 can be any type of items capable of storage therein and need not be limited to those listed here. In an alternative embodiment, side walls 30, 32 may be absent such that drawer 14 acts as a shelf. Rather than being enclosed, the drawer 14 could take the form of an open rack having a shelf or two or more spaced shelves. In this embodiment, the drawer 14 is preferably constructed from a substantially durable yet relatively lightweight material such as aluminum that is capable of protecting the contents of drawer 14 yet that is capable of being moved relatively easily by a single user of the storage system 10. The drawer 14 is preferably sized and configured for carrying a load of approximately 250 pounds of evenly distributed weight. Of course, it is within the scope of the present invention to provide storage for loads greater than 250 pounds. The drawer 14 may have a width of approximately 38 inches to 42 inches, a length of approximately 36 to 76 inches, and a depth of approximately 4 inches to 12 inches. A number of dividers 38 may be provided within the cavity 34 to define a number of compartments 42 to maintain the contents of drawer 14 separate from one another. In one embodiment, the dividers 38 are user configurable such that a user may adjust the spacing and arrangement of the dividers 38 so as to accommodate the user's particular storage needs.

The drawer 14 may further include one or more handles 36 on rear end wall 26 for grasping by the user to assist the user in sliding the drawer 14 along frame 12. For instance, handles 36 could be a single, centrally located handle or be a pair of handles 36 disposed on opposing lateral ends of the rear end wall 26. In addition, handles 36 may be replaced by any number of alternative grasping elements such as a hook or strap.

The drawer 14 may include an open top opposite the bottom wall 22. Referring momentarily back to FIG. 1, the top edge of the drawer 14 while in its stowed position may be closely positioned with respect to the cap 24 of the vehicle 16 so that the cap effectively acts as a cover to secure the items within the drawer 14. If the system were installed in a delivery van or other vehicle as stated above as being possible, the top edge of the stowed drawer naturally would be closely positioned with respect to the roof of that vehicle.

Figure 4:
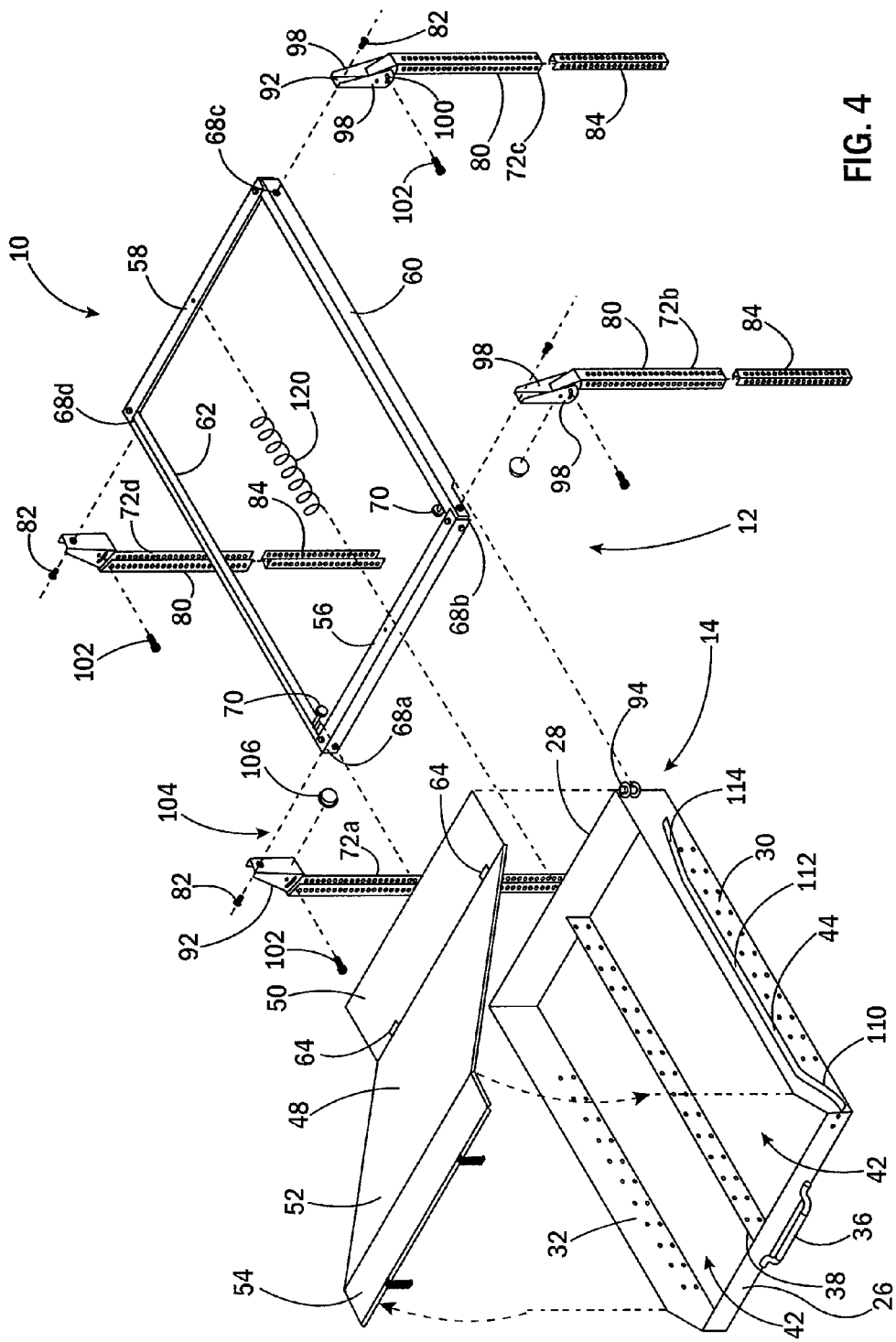
FIG. 4 is an exploded isometric view of the vehicular storage system of FIG. 1.
Figure 5:
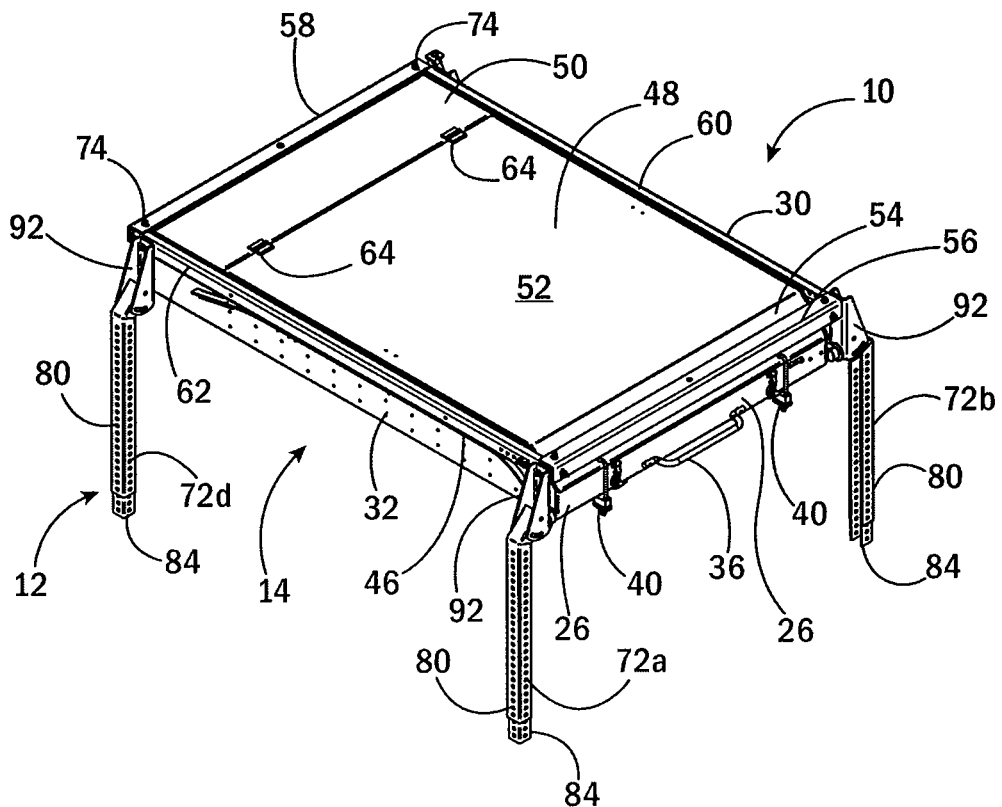
FIG. 5 is an isometric view of the vehicular storage system of FIG. 1 with the vehicular storage system in the stowed position.
Figure 6:
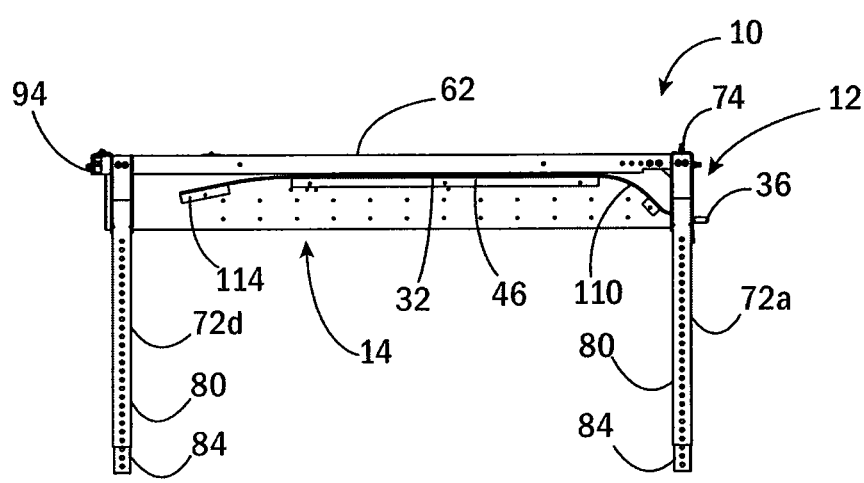
FIG. 6 is a side elevation view of the vehicular storage system of FIG. 1, with the vehicular storage system in the stowed position.
Figure 10:
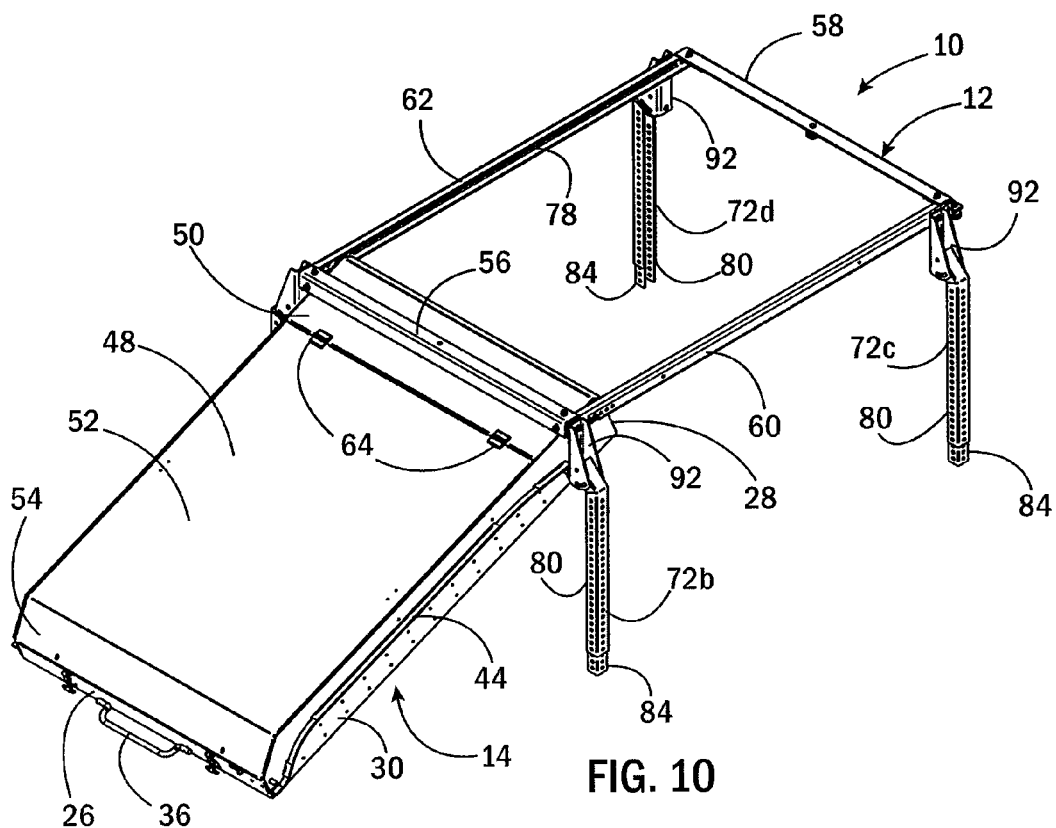
FIG. 10 is an isometric view of the vehicular storage system of FIG. 1, with the vehicular storage system in the deployed position and a cover of the vehicular storage system in a closed position.
Figure 11:
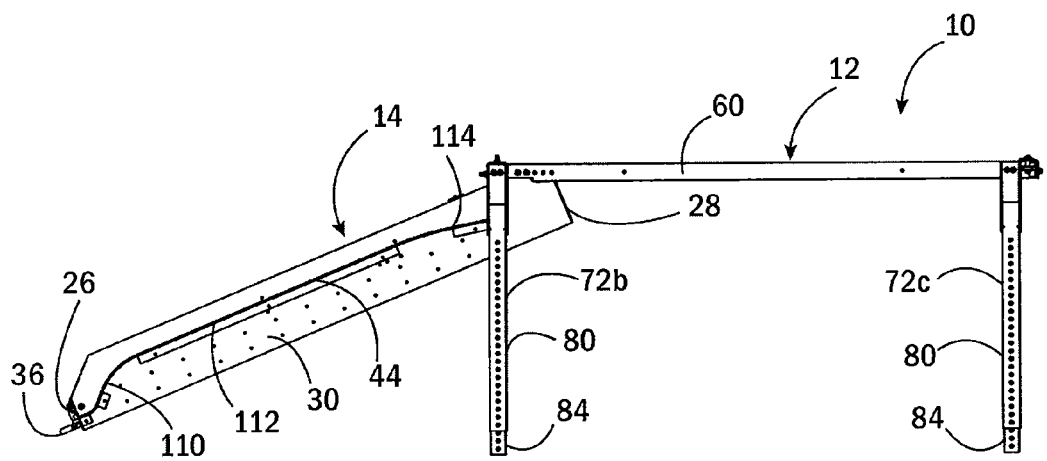
FIG. 11 is a side elevation view of the vehicular storage system of FIG. 1, with the vehicular storage system in the deployed position and the cover of the vehicular storage system in the closed position.

In the alternative, and as shown in the drawings, the drawer 14 may include a cover 48 hingedly or otherwise movably or removably secured to the drawer 14 and configured to cover the top of the drawer 14 to thereby further secure the items stored in the drawer 14. Referring now to FIGS. 3 and 4 in particular, a preferred but exemplary construction of the cover 48 is illustrated. In particular, the cover 48 may include a three-piece construction including a forward portion 50, an intermediate portion 52, and a rearward portion 54. The intermediate portion 52 is coupled to the forward portion 50 by one or more hinges 64 so that the cover 48 may be rotated about the hinges 64 so as to access the cavity 34 when the drawer 14 is in the deployed position.

Figure 12:
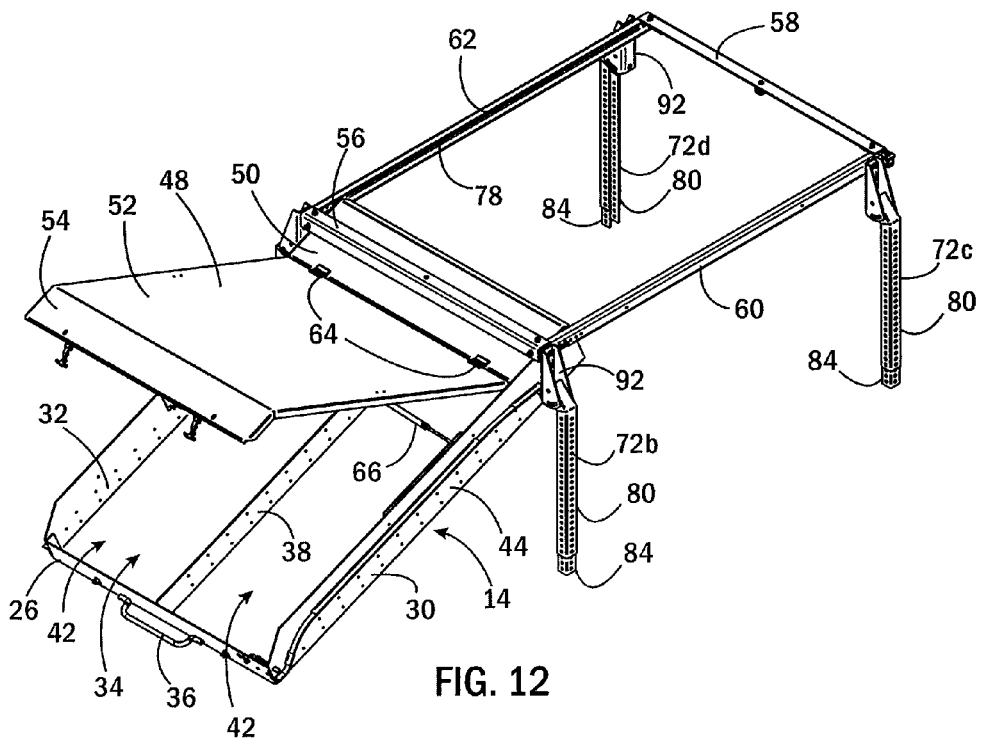
FIG. 12 is an isometric view of the vehicular storage system of FIG. 1, in the deployed position and the cover in the open position.
Figure 13:
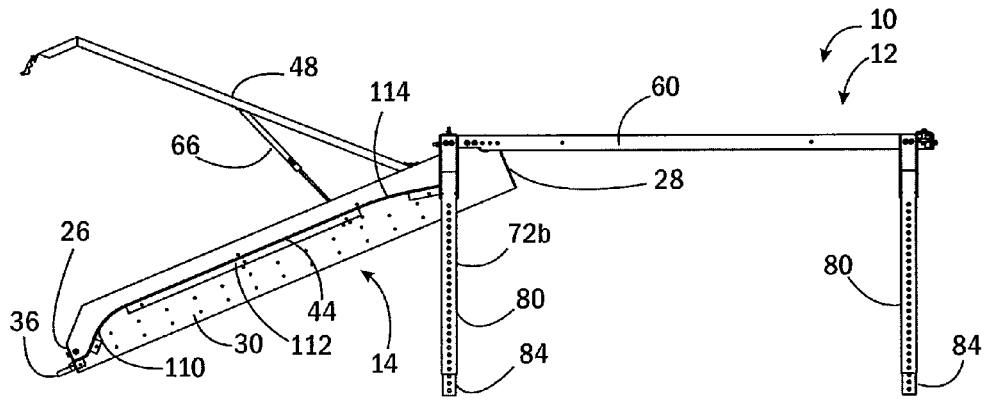
FIG. 13 is a side elevation view of the vehicular storage system of FIG. 1, with the vehicular storage system in the deployed position and the cover in the open position.

Referring now to FIGS. 12 and 13, the drawer 14 is shown in the deployed position in which the drawer is moved rearward relative to the frame 12 and with the cover 48 in the open position. As shown in FIG. 13, the cover 48 may be propped open by an extendible rod or similar element 66. The rod 66 may include a pneumatic or hydraulic cylinder of the kind generally known in the art and be configured to be selectively extended from the bottom wall 22 of the drawer 14 and into engagement with a portion of the underside of the cover 48 so as to maintain the cover 48 in the open position so that the user is free to access the contents of the drawer 14. For instance, the underside of the cover 48 may include a hook (not shown) or similar element configured to be engaged by a portion of the rod 66 so as to selectively couple the rod 66 to the cover 48 to prop the cover 48 in the open position.

Referring again to FIG. 1, the drawer 14 may include a locking assembly 40 configured to secure the drawer 14 to the frame 12 to prevent movement of the drawer 14 relative to the frame 12. The locking assembly 40 may be a standard lock having a keyhole for receiving a key to disengage the locking assembly 40 from the frame 12. Any number of alternative locking assemblies 40 is contemplated and may be used in practicing the storage system 10 of the present invention. For instance, a standard padlock may be employed in combination with a locking hasp that couples the frame 12 and the drawer 14 to one another. For instance, as shown in FIG. 1, the drawer 14 may include a portion extending rearwardly from the rear wall 26 to engage a portion of the frame 12, which may be engaged by a padlock or similar locking assembly 40 to thereby secure the drawer 14 relative to the frame 12.

As noted previously, the drawer 14 includes a pair of drop rails 44, 46 each positioned along one of the respective side walls 30, 32. The drop rails 44, 46 may be integrally formed or otherwise coupled to the side walls 30, 32 and project laterally therefrom to engage corresponding frame rollers 106 (see FIG. 4) to enable movement of the drawer 14 relative to the frame 12 as will be discussed in further detail herein.

Still referring to FIGS. 4-8, the frame 12 is preferably, but exemplarily, constructed from steel or a similar material capable of supporting drawer 14. In particular, frame 12 is preferably constructed from a heavy duty zinc-coated steel frame. Frame 12 includes a pair of laterally extending, opposing end supports 56, 58 interconnected by a pair of longitudinally extending, opposing side supports 60, 62. The end supports 56, 58 are coupled to side supports 60, 62 by way of fasteners 74 or other mechanical coupling means such as welding. End supports 56, 58 and side supports 60, 62 define a generally open interior bounded by the supports for receiving drawer 14. The frame 12 further includes a generally horizontally extending pair of opposing frame rails 78, each disposed on one of the side supports 60, 62. Each of frame rails 78 is configured to receive a corresponding drawer roller 94 fixed to one of the side walls 30, 32 of drawer 14. Thus, as the drawer 14 travels along the drop rails 44, 46, the drawer rollers 94 travel in the frame rails 78 to guide the drawer 14. The frame rails 78 further include stops 70 for defining a maximum extension of drawer 14 from the rear of vehicle 16. The stops 70 are provided near the rear end of rails 78. In this manner, the frame rails 78 maintain the drawer 14 with the frame 12 such that drawer 14 is prevented from being removed therefrom.

The end supports 56, 58 and the side supports 60, 62 of frame 12 are coupled to one another to define four corners 68a, 68b, 68c, 68d (collectively corners 68) of the frame 12 and define a generally rectangular shape, although alternative shapes such as a square are contemplated and within the scope of the invention. A corresponding vertically extending upright support 72a, 72b, 72c, 72d (collectively, upright supports 72) is coupled to the corners 68. The upright supports 72 are coupled to the corners 68 by a fasteners 82, which may be bolts or similar such elements that are secured in place by a nut (not shown) received over the shank of the fastener 82 as is generally understood. In a preferred, but exemplary, construction of the storage system, the upright supports 72 may be configured to have a telescoping construction in which each of the upright supports 72 includes (1) a generally hollow base 80 coupled to one of the respective corners 68 and (2) an extension element 84 that is selectively deployable from the base 80 to adjust the lengths of the upright supports 72. Each of the hollow base 80 and the extension element 84 may include a series of holes configured to be selectively alignable with the holes of the other of the hollow base 80 and the extension element 84 for receiving a pin or similar fastener to thereby secure the extension element 84 to the base 80 and to maintain a relative height of the upright supports 72.

The upright supports 72 are secured to the interior 18 of vehicle 16 by clamping arrangement 86. Each clamping arrangement 86 is mountable to an edge of the rear of the vehicle 16 and the lower end of the one of the upright supports 72. Clamping arrangement 86 may include a C-shaped element 88 coupled by fasteners (not shown) to secure the upright supports 72 to the rear of the vehicle 16. Further, the upright supports 72 may include an end support element (not shown) coupled to the lower ends of the extension by a fastener to provide a wider base upon which the upright supports 72 may rest.

In one embodiment, the corners 68 may be disposed at a lateral distance beyond their interconnection between the end supports 56, 58 and side supports 60, 62 to reveal an exposed end.

The corners 68 are secured to the upright supports 72 by a flange 92. The flange 92 may be welded or otherwise mechanically fixed to the side supports 60, 62, such as by a fastener 82. For instance, the flange 92 may include one or more apertures for receiving fasteners 82 for coupling the flange 92 to the upright supports 72 at an upper end of each respective flange 92.

The flange 92 extends substantially vertically, downwardly from the corner 68 and includes a pair of ears 98 defining an opening therebetween within which the upright supports 72 are received. Each of the ears 98 includes an arcuate slot 100 configured to receive a fastener 102 that extends between the two ears 98 and through the respective upright support 72 to allow for angular adjustment of the upright support 72 relative to the frame 12. In this manner, the upright supports 72 can be adjusted to accommodate a large number of vehicular settings. In this manner, the upright supports 72 can be mounted at any desired angle as shown to mount to a portion of a bed of a vehicle 16.

Still referring to FIGS. 4-8, the side supports 60, 62 each include a roller assembly 104 mounted on a rear end of the side support 60, 62. In particular, each roller assembly 104 is provided near the rear end of the frame 12. The roller assembly 104 may be mounted to an inward facing portion of flange 92. The inward facing portion of flange 92 may be relatively planar and extend downwardly from the respective side supports 60, 62. The flange 92 may include a portion that acts as a stop or catch that is configured to engage a portion of the drawer 14 to maintain the drawer 14 in the stowed position when the vehicle 16 is in operation. A frame roller 106 is coupled to the flange 92 by fastener or similar mechanical arrangement as is generally understood. The frame roller 106 may be a seal bearing roller and sized and positioned to engage an underside of a respective drop rail 44, 46. In this manner, as will be discussed further herein, the drawer 14 is capable of roller over the frame rollers 106 for movement relative to the frame 12 such that the drawer 14 may be selectively removed from the vehicle 16 for accessing the contents of the cavity 34 and for subsequently returning the drawer 14 to a stowed position within the bed of the vehicle 16.

Referring now to FIGS. 10-13, the drop rails 44, 46 of the present invention are shown in further detail. Each of the drop rails 44, 46 approximate a generally inverted U-shaped when viewed from a side thereof. Hence, the drop rails 44, 46 extend generally forwardly from a rear, lower edge of the drawer 14 from a first, rear ramp section 110 that extends generally forwardly and upwardly toward a second, elongate central segment 112 positioned near the top edge of the drawer 14 between the rear end wall 26 of the drawer 14 and the front end wall 28 of the drawer 14. As clearly seen in the drawings, the second segment 112 is substantially longer than the first segment 110. The drawings clearly illustrate that the first segment 110 of each of the drop rails 44, 46 comprises an intermediate, inclined portion positioned between a rearmost horizontal portion of first segment 110 and a front, curved portion extending upwardly and forwardly from a front end of the intermediate portion to a rear end of the second segment 112. The drop rails 44, 46 continue from the central segment 112 and extend generally forwardly and then downwardly from the central segment 112 toward the front of the drawer 14 to define a forward ramp segment 114. It is generally understood, of course, that the drop rails 44, 46 may have alternative constructions or configurations in which the slope of the ramps are relatively steeper or shorter in length as compared to the central segment 112. The drop rails 44, 46 constrain the travel of the drawer 14 relative to the frame 12. Accordingly, when the drawer 14 is in its stowed position, the drawer 14 is supported on the rear ramp section 110 at the frame roller 106.

Still referring to FIGS. 10-13 as well as FIGS. 1-3, in operation, the user of the storage system 10 may move the drawer 14 from the stowed position to the deployed position by pulling on the handles 36 toward the rear of the vehicle 16 such that the drawer 14 moves generally rearwardly and remains substantially horizontally oriented until the frame rollers 106 engage the rear ramp section 110, at which point the rear end wall 26 of the drawer drops relative to the remainder of the drawer 14. The rollers 106 continue to travel up the first ramp sections 110 until they reach a rear edge of the central segment 112 at which point the drawer 14 is positioned in an intermediate position as shown in FIG. 2. Once the drawer 14 is in the intermediate position, the user simply pulls the handles of the drawer 14 rearwardly such that the central segments 112 of the drop rails 44, 46 continue to advance along the frame roller 106. Accordingly, the drawer 14 is lowered rear-end first generally rearwardly and downwardly along the path defined by the central segments 112 of the drop rails 44, 46. As the drawer 14 continues to advance toward the rear of the vehicle 16, the forward ramp section 114 of the drop rails 44, 46 engage the frame roller 106 until the majority of the drawer 14 is entirely outside of the rear of the vehicle 16. In this manner, the user of the system 10 can easily access the entire contents of the cavity 34.

To move the drawer 14 from the deployed position to the stowed position, the user simply lifts the drawer 14 at its rear end wall 26 via handles 36 such that the drop rails 44, 46 move forward with respect to the vehicle 16 along frame roller 106 via forward ramp section 114. As the drop rails 44, 46 move forward along the frame roller 106, the forward ramp section 114 engages the rollers to thereby begin to lift the drawer 14 back into the vehicle 16. After clearing the forward ramp section 114, the central segment 112 of the drop rails 44, 46 engage the frame roller 106 for forward and upward movement of drawer 14 until drawer 14 reaches the rear edge of the central portion defining the intermediate position To complete the movement of the drawer 14 to the stowed position, the user lifts upwardly on the handles 36 to thereby engage the rear ramp section 110 and then rear ramp section 110 of the drop rails 44, 46 such that the drawer 14 is moved back into the rear of the vehicle and back to its stowed position.

The drop rails 44, 46 of the drawer 14 allow the drawer 14 to travel along a predetermined path defined thereby, while allowing the drawer 14 to extend substantially out of the rear of the vehicle. Further, the drawer 14 is completely suspended by frame 12 such that the drawer 14 does not come to rest on any part of the rear of the vehicle 16. In particular, the drawer 14 remains coupled to the frame by way of the engagement of the drawer rollers 94 to the frame rails 78. That is, the weight of drawer 14 is borne by frame 12 at all times. In this manner, unwanted contact between drawer 14 and vehicle 16 is avoided to thereby prevent damage to the vehicle. In particular, the drawer 14 is able to be pulled through the rear of the vehicle 16 without contacting the tailgate of the vehicle 16. Moreover, because the weight is borne by the frame 12, the user of system 10 does not have to exert much force onto drawer 14 to move drawer 14 between the stowed and deployed positions.

Now referring back to FIG. 4, in a preferred embodiment, a spring-assist mechanism 120 may be provided for assisting movement of the drawer 14 between the stowed position and this intermediate position. In particular, the spring assist mechanism 120 includes at least one coil spring that pretensions the drawer 14 such that, when the user moves drawer 14 from its stowed position to the intermediate position, the drawer 14 is moved in a controlled manner rather than having the entirety of its weight fall forward. In this manner, the drawer 14 is lowered in a controlled manner. Likewise, the spring-assist mechanism 120 may assist the user in moving the drawer 14 from this intermediate position and back to the stowed position.

The spring-assist mechanism 120 may additionally comprise an assist cable (not shown) cooperating with a carabineer or similar mechanical means for controlling the tension applied to the spring-assist cable. Of course, alternative known methods of providing a spring assist are within the scope of the present invention.

Although the best mode contemplated by the inventor of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

I claim:

1. A vehicular storage system for mounting within a rear storage compartment of a vehicle, the storage compartment being covered by a roof, an opening being formed at a rear of the storage compartment, the vehicular storage system comprising:
   a stationary frame supportably mounted within the rear storage compartment of the vehicle;
   a drawer having a bottom and a top edged;
   a non-linear drop rail and roller assembly arranged between the frame and the drawer, the drop rail and roller assembly including at least two opposed drop rails located on opposite sides of the drawer and supported on one of the drawer and the frame and at least two opposed rollers located on opposite sides of the drawer and mounted on the other of the drawer and the frame, wherein the drop rail and roller assembly is configured to enable a selective movement of the drawer relative to the frame through a non-linear path along the drop rail and roller assembly between 1) a stowed position in which the drawer is disposed at least substantially horizontally and is housed at least substantially entirely within the area of the rear of the vehicle with the top edge of the drawer being closely positioned to the roof and 2) a deployed position in which the drawer is inclined downwardly and rearwardly and is positioned at least partially outside the rear of the vehicle and in which the top edge of at least a majority of the drawer is located well-beneath the roof;
   wherein each drop rail is shaped such that, when the drawer is in the stowed position thereof, a first segment of the drop rail extends upwardly and forwardly relative to the vehicle, and a second segment of the drop rail extends horizontally forwardly from an upper end of the first segment, the second segment being substantially longer than the first segment, and wherein the associated roller rides along the first segment of each drop rail as the drawer moves from the stowed position to an intermediate position and along the second segment as the drawer moves from the intermediate position toward the deployed position; and
   wherein the first segment of each of the drop rails comprises an intermediate, inclined portion positioned between a rear-most horizontal portion of the first segment and a front, curved portion extending upwardly and forwardly from a front end of the intermediate portion to a rear end of the second segment, each roller engaging the rear-most horizontal section of the first segment of the associated drop rail when the drawer is in the stowed position thereof and engaging the inclined portion of the associated drop rail when the drawer is in the intermediate position thereof.

2. A vehicle comprising:
   a passenger compartment;
   a rear storage compartment, the rear storage compartment being covered by a roof, an opening being formed at a rear of the storage compartment; and
   a vehicular storage system including
     a stationary frame coupled within the rear storage compartment, first and second laterally opposed frame rollers mounted on the frame;
     a drawer having a floor and a top edge located above the floor; and
   first and second opposed non-linear drop rails mounted on opposite sides of the drawer, each of the drop rails being supported on an associated one of the frame rollers so as to permit the drawer to move rearwardly along a non-linear path between 1) a stowed position in which the drawer is disposed at least substantially horizontally and is housed at least substantially entirely within the rear storage compartment of the vehicle with the top edge of the drawer being closely positioned with respect to the roof and 2) a deployed position in which the drawer is inclined downwardly and rearwardly and is positioned at least partially outside the rear of the vehicle and in which the top edge of at least a majority of the drawer is located well-beneath the roof;
   wherein each drop rail is shaped such that, when the drawer is in the stowed position thereof, a first segment of the drop rail extends upwardly and forwardly relative to the vehicle, and a second segment of the drop rail extends horizontally forwardly from an upper end of the first segment, the second segment being substantially longer than the first segment, and wherein the associated roller rides along the first segment of each drop rail as the drawer moves from the stowed position to an intermediate position and along the second segment as the drawer moves from the intermediate position toward the deployed position; and wherein the first segment of each of the drop rails comprises an intermediate, inclined portion positioned between a rear-most horizontal portion of the first segment and a front, curved portion extending upwardly and forwardly from a front end of the intermediate portion to a rear end of the second segment, each frame roller engaging the rear-most horizontal section of the first segment of the associated drop rail when the drawer is in the stowed position thereof and engaging the inclined portion of the associated drop rail when the drawer is in the intermediate position thereof.

3. A method of operating a vehicular storage system, the method comprising:
sliding a drawer with respect to a positionally fixed frame to which the drawer is mounted non-linearly
from a stowed position in which the drawer extends at least substantially horizontally, is positioned at least substantially entirely within the area of a rear of a vehicle beneath a roof of the vehicle, and in which a top edge of the drawer is closely positioned with respect to the roof the vehicle,
to a deployed position in which a rear end of the drawer is tilted downwardly and extends from a rear opening of the vehicle and the portion of the drawer that is positioned outside of the rear opening is located beneath the roof, wherein, during the sliding movement, a roller mounted on one of the drawer and the frame rolls along a non-linear drop rail mounted on the other of the drawer and the frame to direct the rear end of the drawer downwardly and outwardly,
pushing the drawer upwardly and forwardly from the deployed position to an intermediate position in which the drawer extends at a shallower angle relative to the horizontal than the drawer is in when the drawer is in the deployed position and in which an upper edge of the rear end of the drawer is located beneath the roof;
wherein the roller engages a rear-most, horizontal portion of the drop rail when the drawer is in stowed position, rides along an upwardly inclined portion of the drop rail as the drawer moves from the stowed position to the intermediate position, and rides along another horizontal portion of the drop rail as the drawer moves from the intermediate position to the deployed position.

4. A vehicular storage system for mounting within a rear storage compartment of a pickup truck, the storage compartment having a floor and being covered by a cap, an opening being formed at a rear of the storage compartment and extending vertically from a floor of the storage compartment, the vehicular storage system comprising:
a stationary frame supportably mounted within the rear storage compartment of the pickup truck;
a drawer having a bottom and having a top edge;
a non-linear drop rail and roller assembly arranged between the frame and the drawer, the drop rail and roller assembly including two opposed drop rails supported on opposite sides of the drawer and two frame rollers located on opposite sides of the drawer and mounted on the fame, wherein each frame roller engages an underside of the associated drop rail, and wherein the drop rail and roller assembly is configured to enable a selective movement of the drawer relative to the frame non-linearly 1) from a first, stowed position in which the drawer is disposed at least substantially horizontally and is housed at least substantially entirely within the rear storage compartment of the vehicle with the top edge of the drawer being closely positioned with respect to the cap and the bottom of the drawer located well above the floor of the storage compartment, 2) to a second, intermediate position in which the drawer is inclined downwardly and rearwardly at a first angle relative to the ground and the top edge of the rearmost portion of the drawer is located below the cap, and 3) to a third, deployed position in which the drawer is inclined downwardly and rearwardly at a second angle relative to the ground and is positioned at least partially outside the rear of the vehicle, the second angle being greater than the first angle, wherein
each drop rail is shaped such that, when the drawer is in the stowed position thereof, a first segment of the drop rail thereof extends upwardly and forwardly relative to the pickup truck, and a second segment thereof extends horizontally forwardly from the first segment, the second segment being substantially longer than the first segment, wherein
an associated roller rides along the first segment of each drop rail as the drawer moves from the stowed position to an intermediate position and along the second segment as the drawer moves from the intermediate position toward the deployed position, wherein
the first segment of each of the drop rails comprises an intermediate, inclined portion positioned between a rearmost horizontal portion of the first segment and a front, curved portion extending upwardly and forwardly from a front end of the intermediate portion to a rear end of the second segment, and wherein
each frame roller engages the rear-most horizontal section of the first segment of the associated drop rail when the drawer is in the stowed position thereof and engages the inclined portion of the associated drop rail when the drawer is in the intermediate position thereof.

5. The vehicular storage system of claim 4, wherein the drawer further comprises a first side wall, a second side wall opposite the first side wall, a first end wall and a second end wall opposite the first end wall.

* * * * *